(No Model.)
J. C. BLAIR.
FOUNTAIN SPITTOON.
No. 575,629. Patented Jan. 19, 1897.
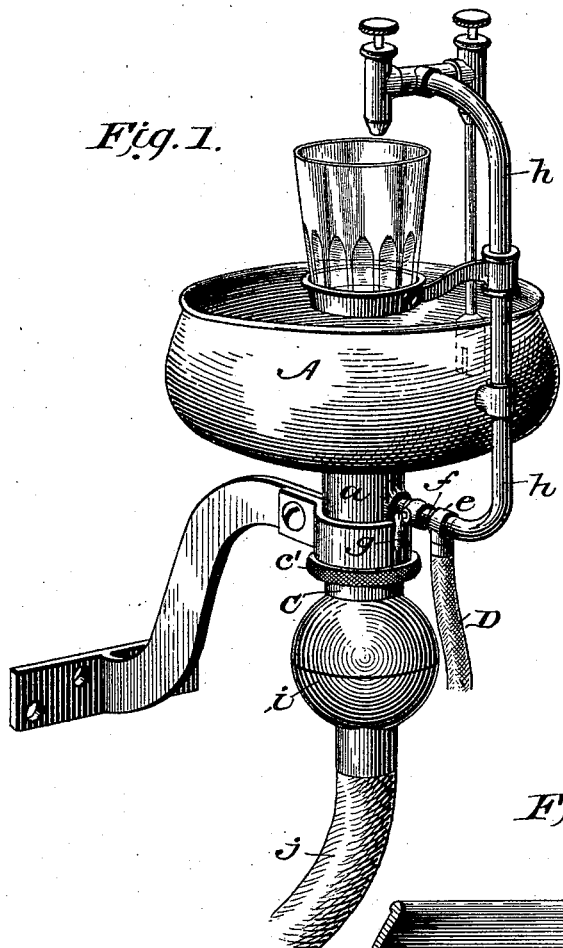
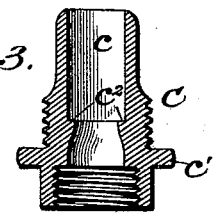
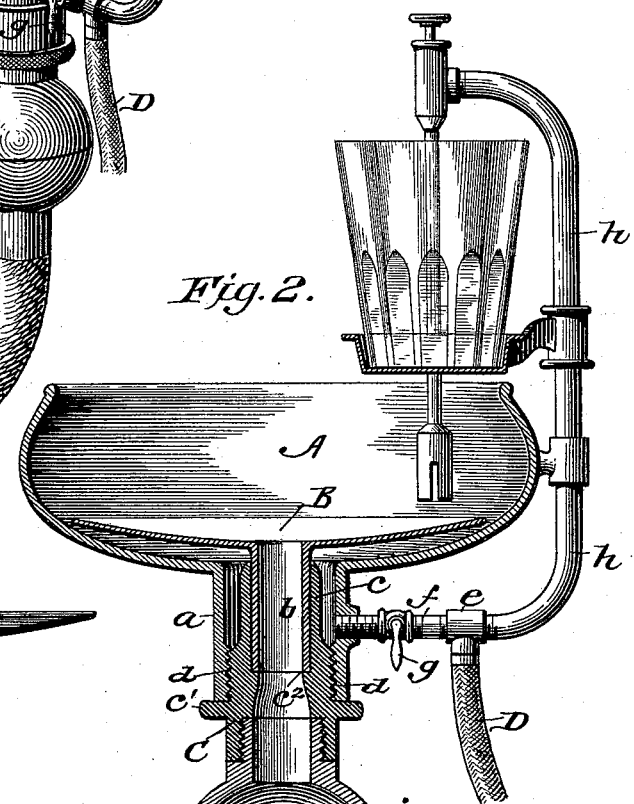
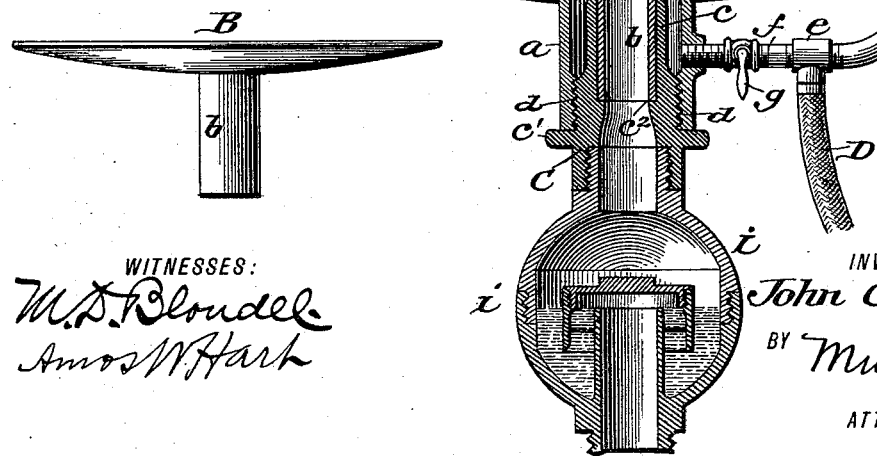
WITNESSES:
M. S. Bloudel
Amos W. Hart
INVENTOR
John C. Blair.
BY Munn & Co.
ATTORNEYS.

UNITED STATES PATENT OFFICE.

JOHN CARLISLE BLAIR, OF LOUISVILLE, KENTUCKY.

FOUNTAIN-SPITTOON.

SPECIFICATION forming part of Letters Patent No. 575,629, dated January 19, 1897.

Application filed September 17, 1896. Serial No. 606,081. (No model.)

*To all whom it may concern:*

Be it known that I, JOHN CARLISLE BLAIR, of Louisville, in the county of Jefferson and State of Kentucky, have invented a new and useful Improvement in Fountain-Spittoons, of which the following is a specification.

My invention is an improvement in the class of fountain-spittoons which are particularly adapted for use of dentists, either as attachments of dentists' chairs or of separate supports. A concave disk constituting a false bottom is arranged in the bowl of the apparatus, and the waste-conduit extends down from the central aperture in the disk, while the inlet communicates with a space that separates said disk from the bowl proper.

Still another feature is the construction of a screw-plug and its attachment to the neck of the bowl.

In the accompanying drawings, Figure 1 is a perspective view of my invention as in use, the apparatus being supported by a wall-bracket. Fig. 2 is a central vertical section of the apparatus. Fig. 3 is an enlarged central longitudinal section of the tubular plug forming part of the apparatus. Fig. 4 is an enlarged side view of the detachable false bottom.

A indicates a bowl, which is preferably constructed of cast-iron, having a porcelain or other vitreous or enamel finish internally and externally. The part B is a slightly-concave disk of glass or thin iron having a porcelain coat on its upper side. This disk forms, practically, a second or false bottom for the bowl A and is raised above the bottom of the latter, its upcurved edge being slightly separated from the side of the bowl, as shown.

The bowl A has a central aperture and a pendent tubular neck $a$, and the disk B has similarly a central aperture and tubular neck $b$, which is of so much less diameter than the bowl-neck $a$ that a space is left between them. Such space communicates with or forms a continuation of the space between the disk and bowl proper, and which serves for upward flow of water admitted through pipes for flushing the bowl.

A tubular plug C is attached to the bowl and disk necks $a$ and $b$, as shown. It has a vertical cylindrical extension $c$, in which the neck $b$ of disk B fits snugly, being thus held therein by friction.

The plug C is attached to the bowl-neck $a$ by a screw-joint $d$, the said parts being threaded, respectively, exteriorly and interiorly, as shown.

The plug C has a radial circumferential rib $c'$ and a corresponding interior shoulder $c^2$, which form abutments for contact of the bowl and disk necks $a\,b$. The rib $c'$ is preferably milled to facilitate its rotation for attachment and detachment.

A flexible water-conducting pipe D, Fig. 2, is connected by a T $e$ with a short rigid pipe $f$, that is attached to the bowl-neck $a$ and provided with a cock $g$. A rigid gooseneck $h$, having faucet, siphon-tube, and tumbler-holder attachments, is connected with said T $e$.

It will be seen that the pipe D permits the bowl $a$ and disk $b$ to be flushed by water passing up through the space between the necks $a$ and $b$ and bowl and disk proper, the same returning in a circular sheet upon the disk and flowing over its surface to the central aperture, where it escapes through the neck $b$ into a gold-trap $i$, having a drain-pipe $j$, Fig. 1, attached. Thus the disk B may ordinarily be kept clean; but when necessary it may be readily detached for the purpose of cleaning it in a more thorough manner.

The statement that the edge of the false bottom B is separated from the bowl A is to be understood with the qualification that such separation need not be always complete, although preferably so, since it is apparent that, even if the parts be in contact at a few points, the upward flow of water would still be effectual for washing the surface of the disk.

What I claim is—

1. In a fountain-spittoon, the combination, with centrally-apertured bowl having a pendent tubular neck, and the disk-like false bottom having a similar aperture and neck, of a detachable apertured plug which closes the space between said necks, and forms an escape for waste water, as shown and described.

2. In a fountain-spittoon, the combination with the bowl and false bottom, having central apertures and pendent tubular necks, arranged one within the other, but separated as specified, of the detachable tubular plug having a vertical extension that receives the neck of the false bottom, and is connected with the bowl-neck by a screw-joint, and water-conducting pipes attached to the bowl-neck and plug, respectively, as shown and described.

3. In a fountain-spittoon, the combination, with the bowl and its false bottom, separated from each other and provided with pendent tubular necks, of the removable plug having a tubular socket that receives the false-bottom neck and supports the latter, and an exterior screw-thread that engages the bowl-neck, and an adjacent circumferential rib forming an abutment for said bowl-neck, and having also a threaded lower portion that adapts the plug for attachment of a waste-pipe, as shown and described.

JOHN CARLISLE BLAIR.

Witnesses:
ED. C. FRENCH,
MAX. M. EBLE.